(12) United States Patent
Hartsell et al.

(10) Patent No.: US 12,472,132 B2
(45) Date of Patent: Nov. 18, 2025

(54) TOPICAL SCALP COMPOSITION

(71) Applicant: The Procter & Gamble Company, Cincinnati, OH (US)

(72) Inventors: Debbie Lynn Hartsell, Cincinnati, OH (US); Kim Lynn Webb, Fairfield, OH (US); Kathleen Marie Kerr, Okeana, OH (US); Karen Marie Osorio, Cincinnati, OH (US); Matthew Joseph Linser, Cincinnati, OH (US); Emma Lynne Klingman, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 738 days.

(21) Appl. No.: 17/536,191

(22) Filed: Nov. 29, 2021

(65) Prior Publication Data
US 2022/0079852 A1 Mar. 17, 2022

Related U.S. Application Data

(63) Continuation of application No. PCT/US2019/040910, filed on Jul. 9, 2019.

(51) Int. Cl.
*A61K 8/34* (2006.01)
*A61K 8/42* (2006.01)
(Continued)

(52) U.S. Cl.
CPC ............ *A61K 8/342* (2013.01); *A61K 8/42* (2013.01); *A61K 8/463* (2013.01); *A61K 8/4926* (2013.01);
(Continued)

(58) Field of Classification Search
CPC . A61K 8/34; A61K 8/42; A61K 8/463; A61K 8/4926; A61K 8/494;
(Continued)

(56) References Cited

U.S. PATENT DOCUMENTS

| 4,847,076 A | * | 7/1989 | Deshpande | ............ | A61Q 5/12 424/47 |
| 6,260,557 B1 | | 7/2001 | Yarbrough | | |

(Continued)

FOREIGN PATENT DOCUMENTS

| CN | 101371814 A | 2/2009 |
| DE | 10347824 A1 | 6/2005 |

(Continued)

OTHER PUBLICATIONS

PCT Search Report and Written Opinion for PCT/US2019/040910 dated Apr. 1, 2020, 19 pages.

(Continued)

*Primary Examiner* — Blessing M Fubara
(74) *Attorney, Agent, or Firm* — Matthew J. Spegele

(57) ABSTRACT

The present disclosure relates to topical scalp care compositions that may be used as leave-on treatments and comprise one or more actives useful for treating symptoms of itch, redness, flaking, and dryness of the scalp. The present disclosure further relates to systems and methods of treating symptoms of itch, redness, flaking, and dryness of the scalp using such topical scalp care compositions.

19 Claims, 2 Drawing Sheets

(51) Int. Cl.
*A61K 8/46* (2006.01)
*A61K 8/49* (2006.01)
*A61Q 19/00* (2006.01)

(52) U.S. Cl.
CPC ............ *A61K 8/494* (2013.01); *A61Q 19/007* (2013.01); *A61K 2800/30* (2013.01); *A61K 2800/75* (2013.01); *A61K 2800/87* (2013.01)

(58) Field of Classification Search
CPC ............ A61K 2800/30; A61K 2800/75; A61K 2800/87; A61Q 19/007
See application file for complete search history.

(56) References Cited

U.S. PATENT DOCUMENTS

| | | | |
|---|---|---|---|
| 9,402,792 | B2 | 8/2016 | Mahmud et al. |
| 9,456,969 | B2 | 10/2016 | Aistrup et al. |
| 9,861,645 | B2 * | 1/2018 | Kazin .................... A61K 31/60 |
| 2003/0147928 | A1 | 8/2003 | Zelle et al. |
| 2005/0002974 | A1 * | 1/2005 | Filbry .................... A61Q 19/00 424/401 |
| 2009/0220445 | A1 | 9/2009 | Iwata et al. |
| 2010/0150854 | A1 | 6/2010 | Schmaus et al. |
| 2011/0005546 | A1 * | 1/2011 | Muller-Grunow ..... A45D 24/22 132/270 |
| 2012/0103151 | A1 | 5/2012 | Jones et al. |
| 2012/0258185 | A1 | 10/2012 | Oblong et al. |
| 2015/0065476 | A1 | 3/2015 | Aistrup et al. |
| 2017/0042772 | A1 * | 2/2017 | Grasl .................. A61K 8/9794 |
| 2017/0128331 | A1 * | 5/2017 | Ishmael ................ A61K 8/342 |

FOREIGN PATENT DOCUMENTS

| | | |
|---|---|---|
| DE | 102010055763 A1 | 6/2012 |
| EP | 3090726 A1 | 11/2016 |
| JP | 4573690 B2 | 8/2010 |
| JP | 4589050 B2 | 9/2010 |
| JP | 5334511 B2 | 8/2013 |
| WO | 9606686 A1 | 3/1996 |
| WO | 9707821 A1 | 3/1997 |
| WO | 2012084419 A2 | 6/2012 |
| WO | 2015164680 A1 | 10/2015 |

OTHER PUBLICATIONS

Database GNPD Mintel; Anonymous: "Anti-Itch Spray", XP055675207, retrieved from www.gnpd.com, Database accession No. 7231299, dated Feb. 3, 2020, 4 Pages.
Database GNPD Mintel; Anonymous: "Haemorrhoids Gel", XP055675214, retrieved from www.gnpd.com, Database accession No. 875529, dated Mar. 7, 2008, 2 Pages.
Database GNPD Mintel; Anonymous: "Physio—Protective Soothing Serum", XP055675160, retrieved from www.gnpd.com, Database accession No. 5124797, dated Sep. 26, 2017, 4 Pages.
Database GNPD Mintel; Anonymous: "Plus+ spray lotion", XP055675209, retrieved from www.gnpd.com, Dtabase accession No. 5480043, dated Feb. 26, 2018, 4 Pages.
Database GNPD Mintel; Anonymous: "Psoriasis Spray", XP055675173, retrieved from www.gnpd.com, Database accession No. 4710073, dated Mar. 28, 2017, 3 Pages.
Database GNPD Mintel; Anonymous: "Spray", XP055675208, retrieved from www.gnpd.com, Database accession No. XP055675208, dated Apr. 24, 2019, 3 Pages.
Database GNPD Mintel; Anonymous: "Urea Scalp Treatment", XP055675174, retrieved from www.gnpd.com, Database accession No. 2607375, dated Aug. 15, 2014, 4 Pages.
Database GNPD Mintl; anonymous: "Scalp Lotion", XP055675176, retrieved from www.gnpd.com Databses accession No. 2253279, dated Sep. 20, 2013, 2 Pages.

* cited by examiner

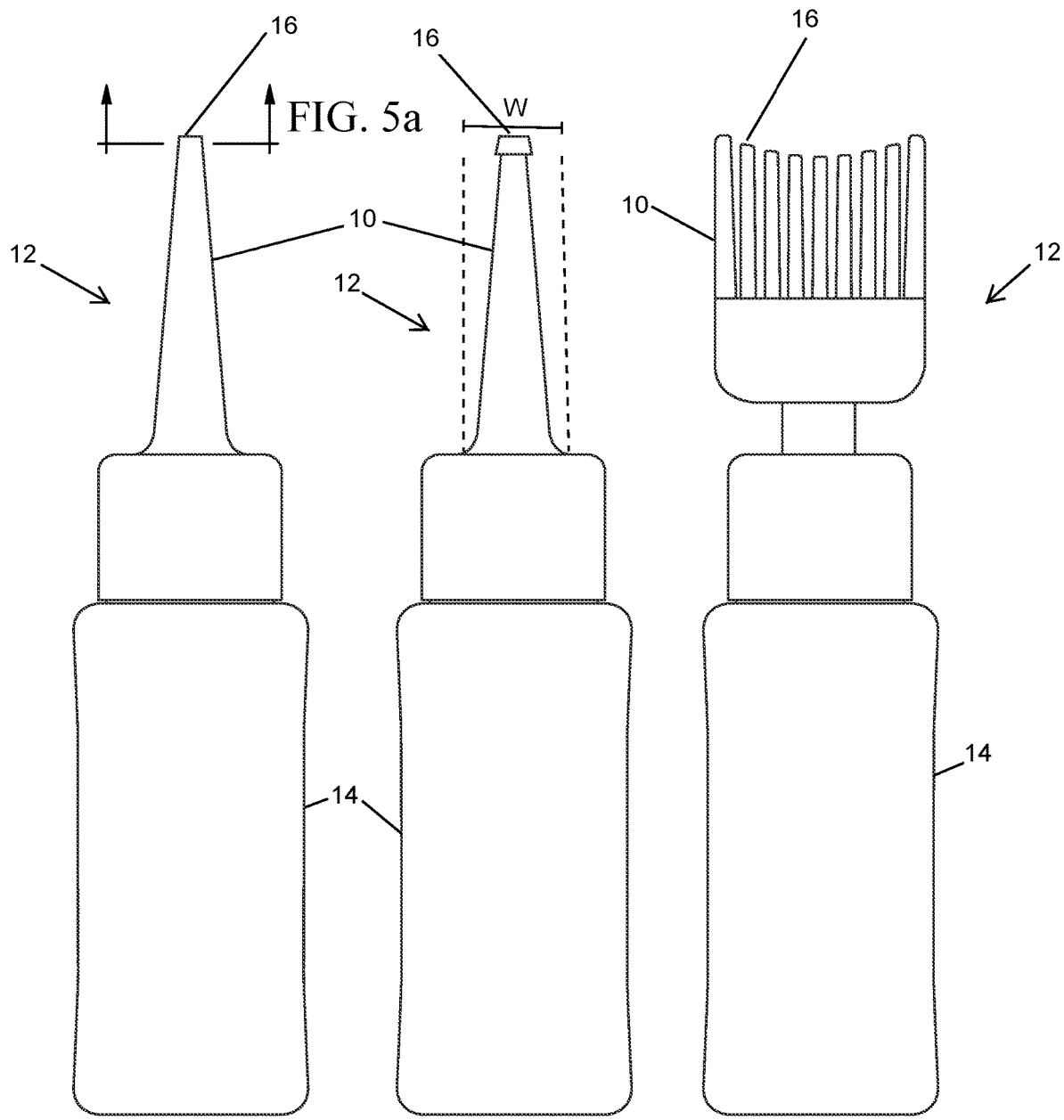
FIG. 2    FIG. 3    FIG. 4
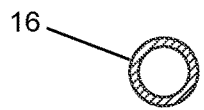            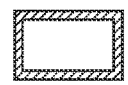
FIG. 5a   FIG. 5b   FIG. 5c   FIG. 5d   FIG. 5e

TOPICAL SCALP COMPOSITION

FIELD OF THE INVENTION

The present disclosure relates to topical scalp care compositions that may be used as leave-on treatments and comprise one or more actives useful for treating symptoms of itch, flaking, scaling, plaques, and dryness of the scalp. The present disclosure further relates to methods of treating symptoms of itch, redness, flaking, and dryness of the scalp using such topical scalp care compositions.

BACKGROUND OF THE INVENTION

Skin conditions on the scalp, such as psoriasis, can prove to be frustrating to those who suffer from them. Symptoms of such conditions on the scalp may include itch, flaking, scaling, plaques, and dryness. Such skin conditions on the scalp may be acute in nature (i.e., occur in a singular, independent incidence) or may be more chronic (i.e., affect the individual for a prolonged period of time).

Rinse-off and leave-on scalp treatment compositions comprising various actives are known. Some commercially available leave-on scalp products may be difficult to apply to the desired location on the scalp, as the products may not stay at the desired location and may get in a user's hair or drip down a user's head. Some products may negatively affect the hair, for example, by matting the hair and/or leaving the hair feeling sticky and making it difficult to style the hair. Rinse-off scalp treatment products may have other disadvantages, such as the need to leave rinse-off products on the scalp for five to ten minutes before rinsing, possible staining of clothing, bed linen, and light-colored hair, irritation of the skin, and a strong odor that may remain after rinsing. Therefore, the use of rinse-off scalp treatment products is typically limited to once per day or less often.

Leave-on hair products for styling hair also exist. Leave-on hair styling products are typically aqueous solutions with high levels of volatile organics, such as low molecular weight alcohols, which may cause skin irritation. These treatments are designed to evaporate quickly to leave little residue and improve the aesthetics of hair but not to treat the scalp.

There is a need for a topical scalp care composition, particularly a leave-on topical scalp care composition, that effectively treats symptoms such as itch, flaking, scaling, plaques, and dryness of the scalp, without irritating the scalp or negatively affecting hair feel or aesthetics. There is a need for a topical scalp care composition, particularly a leave-on topical scalp care composition, that is easy to apply and use—a composition that covers the majority of the treatment area with each application and has a rheology/viscosity that allows for easy dispensing and residence on the treated area without running, dripping, or mounding. There is also a need for a topical scalp care composition that is packaged in an applicator that enables controlled dosing of the composition directly onto affected areas of the scalp.

Surprisingly, it has been found that an aqueous scalp treatment composition, particularly a leave-on aqueous scalp treatment composition, comprising laureth-9 and having select rheological parameters may effectively treat symptoms such as itch, flaking, scaling, plaques, and dryness of the scalp without causing irritation. Furthermore, providing this scalp treatment composition in an applicator that comprises a long, narrow nozzle allows the composition to be directly applied onto the treatment area without negatively impacting the surrounding hair. These features may optimize the consumer usage experience and encourage regular use.

SUMMARY OF THE INVENTION

The present disclosure relates to a topical scalp care composition comprising from about 0.1% to about 10% laureth-9, greater than about 60% water, less than about 5% of ethanol, methanol, iso-propanol, n-propanol, or a mixture thereof, and less than about 5% of an ionic surfactant selected from the group consisting of sodium laureth sulfate, sodium lauryl sulfate, TEA lauryl sulfate, sodium lauroyl sarcosinate, sodium stearate, sodium olefin sulfonate, disodium laureth sulfosuccinate, disodium oleamine sulfosuccinate, sodium dioctyl sulfosuccinate, isethionates, taurates, cetrimonium bromide, cetylpyridinium chloride, sodium lauriminodipropionate, disodium lauroamphodiacetate, cocamido propyl betaine, and mixtures thereof, where the composition has a viscosity of about 1,500 cPs to about 20,000 cPs and where the composition is a leave-on treatment for the scalp.

The present disclosure also relates to a system for treating scalp itch, flaking, scaling, plaques, and/or dryness comprising: a composition comprising laureth-9, greater than about 60% water, and less than about 5% of ethanol, methanol, iso-propanol, n-propanol, or a mixture thereof, where the composition has a viscosity of about 1,500 cPs to about 20,000 cPs and where the composition is a leave-on scalp composition; an applicator comprising a reservoir, for containing from about 25 g to about 600 g of the composition, and one or more nozzles, where each nozzle has at least one opening having an area of from about 0.2 mm² to about 12 mm².

The present disclosure also relates to a system for treating scalp itch, flaking, scaling, plaques, and/or dryness comprising: a composition comprising laureth-9, greater than about 60% water, and less than about 5% of ionic surfactant, where the composition has a viscosity of about 1,500 cPs to about 20,000 cPs and where the composition is a leave-on scalp composition; an applicator comprising a reservoir, for containing from about 25 g to about 600 g of the composition, and one or more nozzles, where each nozzle has at least one opening having an area from about 0.2 mm² to about 12 mm².

BRIEF DESCRIPTION OF THE DRAWINGS

FIG. 2 is a side view of the applicator of FIG. 1

FIG. 3 is a side view of a non-limiting example of an applicator comprising a reservoir and a nozzle having an annular opening.

FIG. 4 is a side view of a non-limiting example of an applicator comprising a reservoir and multiple nozzles.

FIG. 5a is a cross sectional view of a circular opening.

FIG. 5b is a cross sectional view of an annular opening.

FIG. 5c is a cross sectional view of an elliptical opening.

FIG. 5d is a cross sectional view of a square opening.

FIG. 5e is a cross sectional view of a rectangular opening.

DETAILED DESCRIPTION OF THE INVENTION

Figure 1:
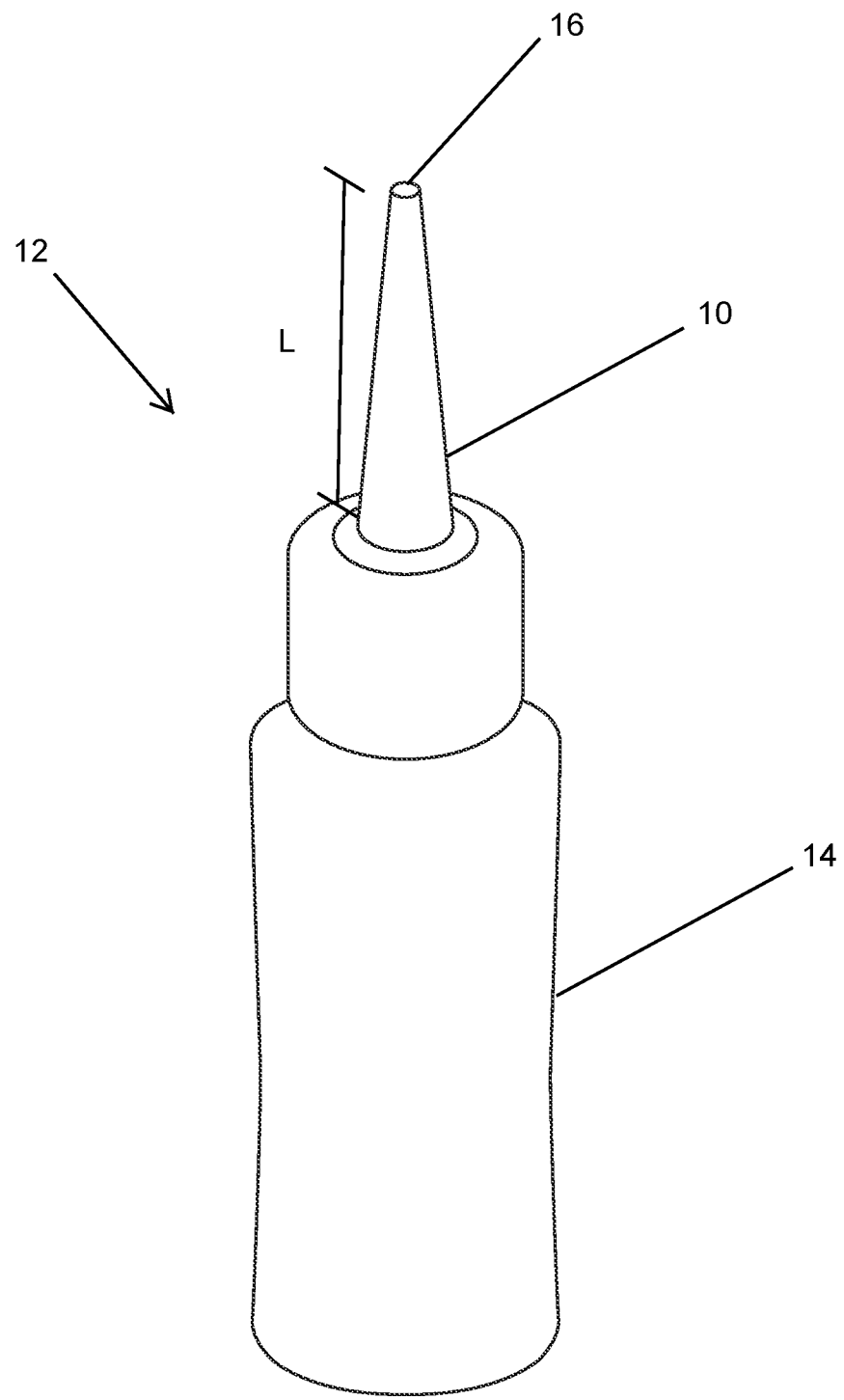
FIG. 1 is an isometric view of a non-limiting example of an applicator comprising a reservoir and a nozzle.

As used herein, the articles "a" and "an" when used in a claim, are understood to mean one or more of what is claimed or described. As used herein, the terms "include," "includes," and "including" are meant to be nonlimiting.

"Apply" or "application," as used in reference to a composition, means to apply or spread the compositions of the present invention onto keratinous tissue, such as the skin.

"Safe and effective amount" means an amount of a compound or composition sufficient to significantly induce a positive benefit.

"Cosmetically acceptable," as used herein, means that the compositions, formulations or components described are suitable for use in contact with human keratinous tissue without undue toxicity, incompatibility, instability, allergic response, and the like.

As used herein, the term "keratinous tissue", refers to keratin-containing layers disposed as the outermost protective covering of mammals which includes, but is not limited to, skin, hair, nails, cuticles, etc.

"Leave-on," in reference to compositions, means compositions intended to be applied to and allowed to remain on the keratinous tissue. These leave-on compositions are to be distinguished from compositions, which are applied to the hair and subsequently (in a few minutes or less) removed either by washing, rinsing, wiping, or the like. Leave-on compositions may exclude rinse-off applications such as shampoos, rinse-off conditioners, facial cleansers, hand cleansers, body wash, or body cleansers. For example, "leave-on compositions" may be left on the keratinous tissue for at least about 60 minutes to up to about 1 week, depending on how often the user washes her hair. A leave-on composition may remain on keratinous tissue between hair washings. The leave-on compositions may be substantially free of ionic surfactants, which may cause irritation.

The terms "substantially free of" or "substantially free from" may be used herein. This means that the indicated material is at the very minimum not deliberately added to the composition to form part of it. The indicated material may be present, if at all, at a level of less than about 1%, or less than about 0.5%, or less than about 0.01%, or less than about 0.0001%, or less than about 0.000001%, or even 0%, by weight of the composition.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C., under atmospheric pressure, and at 50% relative humidity.

In the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Active and other ingredients useful herein may be categorized or described herein by their cosmetic and/or therapeutic benefit or their postulated mode of action. Some active and other ingredients useful herein may provide a benefit related to formulating or manufacturing the composition. However, it is to be understood that the active and other ingredients useful herein can in some instances provide more than one benefit or operate via more than one mode of action. Therefore, classifications herein are made for the sake of convenience and are not intended to limit an ingredient to the particularly stated application or applications listed.

A system for treating the scalp, including scalp itch, flaking, scaling, plaques, and/or dryness, may be provided, where the system comprises a composition and an applicator comprising a reservoir and one or more nozzles. The reservoir may contain from about 25 g to about 600 g of the composition. The one or more nozzles may each have at least one opening having an area from about 0.2 mm$^2$ to about 12 mm$^2$. The composition may comprise laureth-9, greater than about 60% water, and less than about 5% of ethanol, methanol, iso-propanol, n-propanol, or a mixture thereof, where the composition is preferably a leave-on scalp composition and preferably has a viscosity of about 1,500 cPs to about 20,000 cPs.

The system for treating the scalp, including scalp itch, flaking, scaling, plaques, and/or dryness, may be an aerosol, where the composition comprises a propellant. Such as system may comprise a removably attached nozzle, where the nozzle may be cylindrical. In such a system, a consumer may attach the nozzle to the aerosol container, which comprises the reservoir.

Applicator

The applicator (12) may comprise a reservoir (14) and one or more nozzles (10) with one or more openings (16). FIG. 1 is an isometric view of a non-limiting example of an applicator (12) comprising a reservoir (14) and a nozzle (10). FIG. 1 shows how to measure the length (L) of the nozzle. FIG. 2 is a side view of the applicator (12) of FIG. 1. FIG. 3 is a side view of a non-limiting example of an applicator (12) comprising a reservoir (14) and a nozzle (10) having an annular opening. FIG. 3 shows how to measure the width (W) of the nozzle. As seen in FIG. 3, the nozzle may taper from a first end of the nozzle to a second end of the nozzle, such that width (W) will vary along the length (L) of the nozzle. FIG. 4 is a side view of a non-limiting example of an applicator (12) comprising a reservoir (14) and multiple nozzles (10). FIGS. 5a, 5b, 5c, 5d, and 5e are cross sectional views of a circular opening (16), an annular opening (16), an elliptical opening (16), a square opening (16), and a rectangular opening (16), respectively.

The reservoir may contain from about 25 g to about 600 g, or from about 40 g to about 400 g, or from about 50 g to about 250 g of the scalp care composition. The one or more nozzles may be about 8 mm to about 100 mm, or about 10 mm to about 80 mm, or about 15 mm to about 60 mm, or about 20 mm to about 50 mm, or about 25 mm to about 40 mm in length (L). The one or more nozzles may have widths (W) of about 1 mm to about 20 mm, or about 2 mm to about 15 mm, or about 4 mm to about 13 mm. The one or more nozzles may be tapered, in which case width (W) will vary along the length (L) of the nozzle, as shown in FIGS. 1-3. The nozzle may be cylindrical, in which case width (W) is constant along the length (L). The applicator may be transparent or translucent.

The applicator may have one or more removably attached nozzles, allowing the applicator and the topical scalp care composition to be shipped in a more compact package. The topical scalp care composition may be shipped in sealed or capped reservoir, where the consumer removes the seal or cap and attaches the nozzle before use. Alternatively, the consumer may transfer the topical scalp care composition from another container into the reservoir and then attach the nozzle. If removable, the nozzle may comprise any number of different means for attaching it to the reservoir. The attachment structures may be disposed on a nozzle or the same attachment structures may alternatively be disposed on a reservoir. At least one of the nozzles or its corresponding reservoir may comprise either a recess or a protrusion that engage one another to removably attach the nozzle to the reservoir. In some examples, the recess and protrusion may be provided in the form of male and female threads, a bayonet fitment, or a groove and ring. Alternatively, a nozzle and a reservoir may removably engage by means of a friction or interference fit or magnets or other means. A nozzle may be removably attached using a female snap-fit connection of the nozzle, which engages a male snap-fit of the reservoir. With regard to a press fit, also referred to as an interference fit, the nozzle may comprise a recess in the form of an annular channel that removably engages a corresponding ring on the mating reservoir. The nozzle may comprise a conduit and the conduit may have a tapered inner surface that engages a corresponding tapered outer surface of an upstanding channel of the mating reservoir.

In some instances, one or more nozzles may be provided as part of a kit. Some kits may comprise two or more of the nozzles of different sizes, shapes, and/or are formed from different materials. A plurality of kits may be offered for sale to consumers as part of a product or brand line-up.

The applicator may comprise a plurality of nozzles, or twenty or fewer nozzles, or fifteen or fewer nozzles, or ten or fewer nozzles, or five or fewer nozzles. The nozzles may be arranged in an array of one row, two rows, three rows or four or more rows. The nozzles may be arranged in parallel rows or offset rows. The nozzles may be randomly or evenly distributed throughout the area of the array. The nozzles may be arranged in a circular configuration. The cross section of the array may be circular, oval, square or rectangle. The dimension of the array may be about 1 mm to about 70 mm, or about 2 mm to about 60 mm, or about 3 mm to about 50 mm, or about 3 mm to about 40 mm or about 3 mm to about 30 mm.

The openings in the nozzle(s) may be circular or substantially circular, annular or substantially annular, elliptical or substantially elliptical, square or substantially square, rectangular or substantially rectangular, or any other geometric shape that allows the composition to flow through the opening. Each opening may have an area from about 0.2 $mm^2$ to about 12 $mm^2$, or from about 0.5 $mm^2$ to about 10 $mm^2$, or from about 1 $mm^2$ to about 8 $mm^2$. The total area of all the openings is from about 0.2 $mm^2$ to about 20 $mm^2$. A circular or substantially circular opening may have a diameter of about 0.5 mm to about 4 mm, or about 0.6 mm to about 3 mm, or from about 0.7 mm to about 2 mm. Each nozzle may have a plurality of openings, arranged in various configurations.

Topical Scalp Care Compositions

The topical scalp care composition preferably improves a user's scalp symptoms without negatively affecting the user's hair. A user of topical scalp care compositions has unique needs. This user may not wash her hair daily, so as to avoid irritating her scalp. As such, it may be advantageous for a topical scalp care composition to reside on the scalp and not migrate to a user's hair shaft, where it can build up over multiple uses between washing and weigh the hair down, making it difficult to style. A topical scalp care composition that lifts the hair may be advantageous. A topical scalp care composition is also generally more effective when the composition has a longer residence time on the scalp; a leave-on treatment maximizes residence time on the scalp (versus a rinse-off product, such as a shampoo). A scalp care composition that has a longer residence time, such as a leave-on composition, however, may need to be formulated to reduce negative effects on the surrounding hair. For example, a leave-on composition may be substantially free of oils, which can weigh down the hair or make it look greasy. A topical scalp care composition, particularly a leave-on composition, may be substantially free of alcohol, which can dry out the scalp, aggravate any open wounds on the scalp, and/or cause a burning sensation.

A topical scalp care composition is preferably convenient and pleasant to use, to encourage regular use, which may increase the effectiveness of the product. The viscosity of the topical scalp care composition may be selected such that the composition is viscous enough to stay in place, but not so viscous that it mounds, gets onto the hair, and/or is difficult to rub into the scalp.

The topical scalp care composition may be provided in a selected package that allows the composition to be dispensed easily throughout the life of the product. For example, the composition readily flows, even when the package is only partially full, from the bottom of the package to the opening of the package. The force required to dispense the composition is preferably low enough that the user can easily dispense the composition (particularly since psoriatic arthritis, which makes it painful to apply high compression forces, is a co-morbidity with psoriasis). The force required to dispense the composition may be less than about 22 N. Also, when the packaged is squeezed, a predictable amount of the composition may be dispensed each time. At the same time, the composition preferably does not leak from the package, when the package is inverted but no force is applied to the package.

Topical scalp care compositions of the present disclosure may be applied to a mammalian scalp, in particular to a human scalp. The topical scalp care compositions useful in the subject disclosure may be made into a wide variety of product forms including, but not limited to, sprays, tonics, gels, solutions, suspensions, aerosol sprays, foams, mousses, and the like. The topical scalp care composition may be a solution. Preferably, the topical scalp care composition are leave-on compositions.

The topical scalp care composition may be transparent or translucent. The composition may be substantially odorless.

The topical scalp care composition may be an aqueous, leave-on composition that comprises Laureth-9, water, less than about 5% of ethanol, methanol, iso-propanol, n-propanol, or a mixture thereof, less than about 5% ionic surfactant, and has a Brookfield viscosity between about 1,500 cPs and about 20,000 cPs. It may also beneficial for the composition to have a CaBER break time of less than 0.6 seconds, to avoid stickiness.

Laureth-9

The topical scalp care composition may comprise from about 0.1% to about 10%, or from about 0.2% to about 8%, or from about 0.5% to about 6%, or from about 0.75% to about 5%, or from about 1% to about 4% by weight of the composition of laureth-9.

It is generally known to use laureth-9 as an antipruritic component to treat itching. Laureth-9 has also been used in shampoos and wash lotions as a nonionic emulsifier and nonionic surfactant.

It has been found that the inclusion of laureth-9 in the scalp care compositions disclosed herein may help treat symptoms such as itch, flaking, scaling, plaques, and dryness of the scalp, without causing irritation. More specifically, the incorporation of laureth-9 in the topical scalp care composition may reduce flaking on the scalp.

The chemical structure of Laureth-9 is as follows:

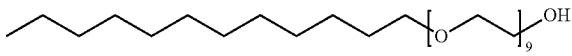

Laureth-9 (INCI name) is also known as Hydroxyl polyethoxy dodecane, Oxypolyethoxydodecane, Dodecylpolyethyleneglycolether, Macrogol lauryl ether or 3,6,9,12,15,18,21,24,27-nonaoxaonatriacontan-1-ol (IUPAC name). Its chemical formula is $C_{30}H_{62}O_{10}$. Laureth-9 is a polyethylene glycol ether of lauryl alcohol with an average ethylene oxide value of 9.

Water

The topical scalp care composition of the present disclosure may be an aqueous composition that comprises at least 50%, or from about 50% to about 98%, or from about 55% to about 98%, or from about 60% to about 98%, or from about 70% to about 97%, or from about 80% to about 96%, or from about 90% to about 95% by weight of the composition, or from about 92% to about 95% by weight of the composition of water. The topical scalp care compositions may comprise greater than about 60% water, or greater than about 70% water, or greater than about 80% water, or greater than about 90% water, or greater than about 92% water.

The composition may further comprise moisturizing agents, conditioning agents, anti-microbials, humectants, and/or other skin care actives, e.g., water-soluble actives. In a non-limiting example, the composition may comprise a humectant, such as glycerin, and/or other polyols. These agents may be water-soluble or water-dispersible.

Low Molecular Weight Alcohol

The topical scalp care composition may comprise less than about 5%, or less than about 3%, or less than about 1% of ethanol, methanol, iso-propanol, n-propanol, or a mixture thereof. The topical scalp care composition may be substantially free of ethanol, methanol, iso-propanol, n-propanol, or a mixture thereof.

Ionic Surfactants

The topical scalp care composition may comprise less than about 5%, or less than about 3%, or less than about 1% of an ionic surfactant. The topical scalp care composition may be substantially free of an ionic surfactant. Ionic surfactants are commonly used as cleansing surfactants and may be irritating to a scalp affected by psoriasis.

Ionic surfactants are surfactants comprising at least one ionic moiety, in the form of either a negatively-charged or a positively-charged headgroup. Ionic surfactants include anionic surfactants, cationic surfactants, and zwitterionic surfactants. Anionic moieties include sulfonic acid, alcohol sulfate, benzene sulfonates, phosphoric acid esters, carboxylic acid, and salts thereof. Cationic moieties include primary, secondary, tertiary, or quaternary amines. The cationic moiety may be a quaternary amine. Zwitterionic surfactants are surfactants that carry both a positive and a negative charge, where these charges can either be permanent or dependent on pH value. In zwitterionic surfactants, the cationic moiety may be an amine, such as a quaternary ammonium cation, whereas the anionic moiety may be a carboxylic, sulfuric, or phosphoric acid (or esters thereof) moiety.

The tails of most ionic surfactants are fairly similar, comprising a hydrocarbon chain, which can be branched, linear, or aromatic. The hydrocarbon chain may be an alkyl or alkenyl moiety comprising from about 8 to about 20, or from about 10 to about 18, or from about 11 to about 17, or from about 12 to about 16 carbon atoms. Ionic surfactants may be described by the actual number of carbons in the hydrocarbon chain or the average of a distribution of hydrocarbon chains. Some ionic surfactants may be alkoxylated, e.g., ethoxylated, where the surfactant comprises one or more covalently bound alkoxy groups, such as one or more ethoxy groups. Ethoxylated surfactants may comprise from about 2 to about 25 ethoxy groups, or from about 3 to about 20 ethoxy groups, or from about 4 to about 15 ethoxy groups.

Examples of anionic surfactants include sodium lauryl sulfate, ammonium lauryl sulfate, sodium myreth sulfate, sodium lauryl ether sulfate, sodium lauroyl sarcosinate, sodium stearate, sodium olefin sulfonate, disodium laureth sulfosuccinate, and disodium oleamine sulfosuccinate. Examples of cationic surfactants include cetrimonium bromide, cetylpyridinium chloride, benzalkonium chloride, benzethonium chloride, dimethyldioctadecylammonium chloride, and dioctadecyldimethylammonium bromide. Examples of zwitterionic surfactants include cocamidopropyl betaine, sodium lauriminodipropionate, and disodium lauroamphodiacetate.

The scalp care compositions may comprise less than about 5%, or less than about 3%, or less than about 1% of an ionic surfactant selected from the group consisting of sodium laureth sulfate, sodium lauryl sulfate and other sulfates (such as TEA lauryl sulfate), carboxylates such as sodium lauroyl sarcosinate and sodium stearate; sulfonates such as sodium olefin sulfonate; sulfosuccinates such as disodium laureth sulfosuccinate, disodium oleamine sulfosuccinate, and sodium dioctyl sulfosuccinate; and others such as isethionates and taurates; cationic surfactants, such as cetrimonium bromide, cetylpyridinium chloride; and zwitterionic surfactants, such as sodium lauriminodipropionate, disodium lauroamphodiacetate, cocamido propyl betaine.

Additional Actives

Preservatives

The topical scalp care composition may comprise at least 0.0001%, about 0.001%, about 0.01%, about 0.05%, about 0.1%, about 0.5%, by weight of the composition, a preservative. Preservatives are commonly used in topical scalp care compositions to prevent or retard the formation of yeast, bacteria, and/or mold.

The topical scalp care composition of the present disclosure may comprise a preservative selected from the group consisting of benzoic acid and salts thereof, benzyl alcohol, benzylhemiformal, benzylparaben, 5-bromo-5-nitro-1,3-dioxane, 2-bromo-2-nitropropane-1,3-diol, butyl paraben, phenoxyethanol, methyl paraben, propyl paraben, diazolidinyl urea, sodium benzoate, calcium benzoate, calcium propionate, caprylyl glycol, biguanide derivatives, captan, chlorhexidine diacetate, chlorhexidine digluconate, chlorhexidine dihydrochloride, chloroacetamide, chlorobutanol, p-chloro-m-cresol, chlorophene, chlorothymol, chloroxylenol, m-cresol, o-cresol, DEDM hydantoin, DEDM hydantoin dilaurate, dehydroacetic acid, diazolidinyl urea, dibromopropamidine diisethionate, DMDM hydantoin, glyceryl caprylate, potassium sorbate, hexamidine, capryloyl glycine, 1,2-hexanediol, undecylenoyl glycine, ethylhexylglycerin, caprylhydroxamic acid, methylpropanediol, hinokitiol, sodium hinokitiol, phenylethyl alcohol, levulinec acid, p-anisic acid, 2-bromo-2-nitropi pane-1,3-diol, sodium hydroxymethylglycinate, iodopropynyl bulylcarbamatc, methylchloroisothiazolinone, methylisothiazolinone, piroclone olamine, cinnamon oil, rosemary extract, and combinations thereof.

Thickening Agent/Rheology Modifier

Topical scalp care compositions may also comprise from about 0.01% to about 10%, preferably from about 0.1% to about 5%, more preferably from about 0.2% to about 5% by weight of the topical scalp care composition, of a thickening agent. The thickening agent may be provided in any amount known to one skilled in the art to facilitate achieving the desired viscosity in combination with the other ingredients in the scalp care composition. Thickening agents may be used to adjust the viscosity of a composition without substantially changing its other properties. Thickening agents may also improve the suspension of other ingredients. Some thickening agents may also function as stabilizers when they are used to maintain the stability of an emulsion.

Non-limiting examples of thickeners that may be suitable for use herein include gums, modified gums, starches, modified starches, clays, and cross-linked water swellable polymers. Other non-limiting examples of thickeners are disclosed in U.S. Publication No. 2008/0051497 and U.S. Pat. No. 9,795,552. The topical scalp care composition may comprise a thickening agent selected from the group consisting of carboxylic acid polymers, crosslinked poly(meth)acrylate polymers, polyacrylamide polymers, polysaccharides, gums, crosslinked vinyl ether/maleic anhydride copolymers, crosslinked poly(N-vinylpyrrolidones), and mixtures thereof. Preferably, the topical scalp care composition may comprise a thickening agent selected from the group consisting of carboxylic acid polymers, crosslinked poly(meth)acrylate polymers, polyacrylamide polymers, and mixtures thereof, more preferably selected from the group consisting of crosslinked poly(meth)acrylate polymers, polyacrylamide polymers, and mixtures thereof.

Additional non-limiting examples of thickeners include acrylamide/ammonium acrylate copolymer (and)polyisobutene (and) polysorbate 20; acrylamide/sodium acryloyldimethyl taurate copolymer/isohexadecane/polysorbate 80; acrylates copolymer; acrylates/beheneth-25 methacrylate copolymer; acrylates/C10-C30 alkyl acrylate crosspolymer; acrylates/steareth-20 itaconate copolymer; ammonium polyacrylate/Isohexadecane/PEG-40 castor oil; C12-16 alkyl PEG-hydroxypropylhydroxyethyl ethylcellulose (HM-EHEC); carbomer; crosslinked polyvinylpyrrolidone (PVP); dibenzylidene sorbitol; hydroxyethyl ethylcellulose (EHEC); hydroxypropyl methylcellulose (HPMC); hydroxypropyl methylcellulose (HPMC); hydroxypropylcellulose (HPC); methylcellulose (MC); methylhydroxyethyl cellulose (MEHEC); PEG-150/decyl alcohol/SMDI copolymer; PEG-150/stearyl alcohol/SMDI copolymer; polyacrylamide/C13-14 isoparaffin/laureth-7; polyacrylate 13/polyisobutene/polysorbate 20; polyacrylate crosspolymer-6; polyamide-3; polyquaternium-37 (and) hydrogenated polydecene (and) trideceth-6; polyurethane-39; sodium acrylate/acryloyldimethyltaurate/dimethylacrylamide; crosspolymer (and) isohexadecane (and) polysorbate 60; sodium polyacrylate. Exemplary commercially-available rheology modifiers include ACULYN™ 28, Klucel M CS, Klucel H CS, Klucel G CS, SYLVACLEAR AF1900V, SYLVACLEAR PA1200V, Benecel E10M, Benecel K35M, Optasense RMC70, ACULYN™ 33, ACULYN™ 46, ACULYN™ 22, ACULYN™ 44, Carbopol Ultrez 20, Carbopol Ultrez 21, Carbopol Ultrez 10, Carbopol 1342, Sepigel™ 305, Simulgel™ 600, Sepimax Zen, and combinations thereof.

Natural Extracts/Botanical Extracts

The terms "natural extract" and "botanical extract" are used interchangeably. A natural extract may be extracted from a plant, from the entire plant or from any part thereof (e.g., bark, berries, flowers, leaves, stem, stalk, peels, resins, rhizome, roots, seeds, woods or mixtures thereof). Extracts may be obtained using any suitable method known in the art including: milling, grinding, maceration, infusion, percolation and decoction, Soxhlet extraction, microwave assisted extraction, ultrasound-assisted extraction, sonication extraction, solvent extraction, accelerated solvent extraction, and supercritical fluid extraction. Suitable extraction solvents may include water, ketones, esters, $C_1$ to $C_6$ alcohols, hydrocarbons and mixtures thereof.

The topical scalp care composition may comprise from about 0.000001% to about 5%, or from about 0.00001% to about 5%, or from about 0.0001% to about 1.5%, or from about 0.001% to about 1.5%, by weight of the composition of a natural extract. Natural extracts include plant extracts obtained from plants selected from the group consisting of: *Achillea millefolium* (Yarrow); *Aesuculus hippocastanum* (Horsechestnut); *Althaea officinalis* (Althea mallow, or Marsh Mallow); *Avena sativa* (Oat); *Berberis vulgaris* (Barberry shrub); *Capsella Bursa Pastoris* (Shepherd's Purse); *Cochlearia officinalis* (Spoon Wort); *Conium maculatium* (Hemlock); *Ervum lens* (Lentil); *Hamamelis virginiana* (Virginium Hamamelis); *Hydrastis canadensis* (Orange Root); *Matricaria chamomilla* (Chamomil); *Nasturtium officinale* (Watercress); *Phytolacca decendra* (Poke Root); *Pimpinella saxifraga* (Pimpernal); *Populas alba* (White poplar); *Populus tremuloides* (Trembling poplar); Quaking Aspen, Trembling Aspen, Quakies); *Rhus toxicodendron* (Ivy); *Sambucus nigra* (Elderberry); *Sanguinaria Canadensis* (Canadian Blood root); *Scrophularia nodosa* (Figwort); *Smilax medica* (Sarasaparrilla); *Tussilago farfara* (Coltsfoot); *Veronica officinalis* (Speedwell); and *Vincetoxicum officinale* (Swallow Wort); *Centella asiatica*; willow bark, or mixtures thereof.

Humectants

The topical scalp care composition may comprise a low concentration of humectant, such as polyols (e.g., glycerin), sugars, and sugar alcohols. Typically, products for treating psoriasis on skin contain high concentrations of humectants (5% or greater) to help with skin hydration. However, high concentrations of humectant may leave a sticky residue on the hair.

Topical scalp care compositions may comprise from about 0.01% to about 5%, or from about 0.1% to about 4%, or from about 1% to about 3% by weight of the topical scalp care composition, of a humectant.

Humectants may include polyhydric alcohols, 1,3-butylene glycol, propylene glycol and water and codium tomentosum extract, creatinine, diglycerol, biosaccharide gum-1, glucamine salts, glucuronic acid salts, glutamic acid salts, polyethylene glycol ethers of glycerin (e.g., glycereth 20), glycerin, glycerol monopropoxylate, glycogen, hexylene glycol, honey, and extracts or derivatives thereof, hydrogenated starch hydrolysates, hydrolyzed mucopolysaccharides, inositol, glycosaminoglycans, methoxy PEG-10, methyl gluceth-10, methyl gluceth-20, methyl glucose, 3-methyl-1,3-butanediol, N-acetyl glucosamine salts, polyethylene glycol and derivatives thereof (such as PEG-15 butanediol, PEG-4, PEG-5 pentaerythitol, PEG-6, PEG-8, PEG-9), pentaerythitol, 1,2 pentanediol, PPG-1 glyceryl ether, PPG-9,2-pyrrolidone-5-carboxylic acid and its salts such as glyceryl pca, saccharide isomerate, sericin, sodium poly-aspartate, sodium polyglutamate, sorbeth 20, sorbeth 6, sugar and sugar alcohols and derivatives thereof such as glucose, mannose and polyglycerol sorbitol, trehalose, triglycerol, trimethyolpropane, tris (hydroxymethyl) amino methane salts, and yeast extract, and mixtures thereof.

Nonlimiting examples of polyhydric alcohols may include glycerin, diglycerin, glycerol, erythritol, arabitol, xylitol, ribitol, mannitol, sorbitol, galactitol, fucitol, maltitol, mannose, inositol, triethyleneglycol, sodium pyrrolidone carboxylic acid (PCA), zinc PCA and derivatives and mixtures thereof.

Oils, Ceramides, and Fatty Alcohols

The topical scalp care composition may comprise a low concentration of oils, waxes, ceramides, and fatty alcohols. Oils may include silicone oils and hydrocarbon oils. Nonlimiting examples of oils include coconut oil, soybean oil, olive oil, sunflower oil, safflower oil, shea butter, jojoba oil, almond oil, grapeseed oil, avocado oil, argan oil, rosehip seed oil, manila oil, sesame seed oil, camellia seed oil, lemon balm essential oil, pomegranate seed oil, carrot seed oil, lavender oil, geranium oil, tea tree oil, bergamot oil, moringa oil, rosemary oil, rose oil, lemongrass oil, eucalyptus oil, blue tansy oil, and polydimethylsiloxane. These oils may be used for treating psoriasis on the skin. However, in the context of a scalp care composition, these oils may negatively impact hair look and feel.

The topical scalp care compositions may comprise from about 0.01% to about 10%, or from about 0.1% to about 8%, or from about 0.1% to about 5%, or from about 0.1% to about 3%, or from about 0.1% to about 1% by weight of the topical scalp care composition of an oil, a ceramide, and/or a fatty alcohol.

Vitamins and Derivatives Thereof

The topical scalp care composition may comprise a safe and effective amount of one or more vitamins and derivatives thereof. Nonlimiting examples of vitamins and derivatives thereof may include B3 compounds such as niacinamide, niacinnicotinic acid, tocopheryl nicotinate; B5 compounds, such as panthenol; vitamin A compounds and natural and/or synthetic analogs of Vitamin A, including retinoids, retinol, retinyl acetate, retinyl palmitate, retinoic acid, retinaldehyde, retinyl propionate, carotenoids (provitamin A); vitamin E compounds, or tocopherol, including tocopheryl sorbate, tocopheryl acetate; vitamin C compounds, including ascorbate, ascorbyl esters of fatty acids, and ascorbic acid derivatives such as magnesium ascorbyl phosphate and sodium ascorbyl phosphate, ascorbyl glucoside, and ascorbyl sorbate), and derivatives of any of the aforementioned actives. The term "derivative" as used herein refers to structures which are not shown but which one skilled in the art would understand are variations of the basic compound.

As used herein, "vitamin B3 compound" means a one or more compounds having the formula:

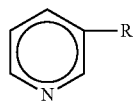

where R is —CONH2 (i.e., niacinamide), —COOH (i.e., nicotinic acid) or —CH2OH (i.e., nicotinyl alcohol); derivatives thereof; mixtures thereof; and salts of any of the foregoing.

Exemplary derivatives of the foregoing vitamin B3 compounds include nicotinic acid esters, including non-vasodilating esters of nicotinic acid (e.g, tocopherol nicotinate, and myristyl nicotinate), nicotinyl amino acids, nicotinyl alcohol esters of carboxylic acids, nicotinic acid N-oxide and niacinamide N-oxide. One or more vitamin B3 compounds may be used herein. Preferred vitamin B3 compounds are niacinamide and tocopherol nicotinate, more preferably niacinamide. When used, salts, derivatives, and salt derivatives of niacinamide are preferably those having substantially the same efficacy as niacinamide.

In a preferred embodiment, the ring nitrogen of the vitamin B3 compound is substantially chemically free (e.g., unbound and/or unhindered), or after delivery to the skin becomes substantially chemically free ("chemically free" is hereinafter alternatively referred to as "uncomplexed"). More preferably, the vitamin B3 compound is essentially uncomplexed. Therefore, if the composition contains the vitamin B3 compound in a salt or otherwise complexed form, such complex is preferably substantially reversible, more preferably essentially reversible, upon delivery of the composition to the skin. For example, such complex should be substantially reversible at a pH of from about 5.0 to about 6.0. Such reversibility can be readily determined by one having ordinary skill in the art. Preferably, the vitamin B3 compound contains a limited amount of the salt form and is more preferably substantially free of salts of a vitamin B3 compound. Preferably the vitamin B3 compound contains less than about 50% of such salt, and is more preferably essentially free of the salt form. The vitamin B3 compound in the compositions hereof having a pH of from about 4 to about 7 typically contain less than about 50% of the salt form.

The composition can contain from about 0.1%, preferably from about 0.5%, more preferably from about 1%, and to about 25%, preferably to about 15%, more preferably to about 7.5% by weight of a vitamin B3 compound.

Xanthine Compound

As used herein, "xanthine compound" means one or more xanthines, derivatives thereof, and mixtures thereof. Xanthine Compounds that can be useful herein include, but are not limited to, caffeine, xanthine, 1-methyl xanthine, theophylline, theobromine, derivatives thereof, and mixtures thereof. Among these compounds, caffeine is preferred in view of its solubility in the composition. The composition can contain from about 0.1%, or from about 0.2%, or from about 0.3%, and to about 10%, or to about 5%, or to about 2% by weight of a xanthine compound.

Panthenol Compound

As used herein, the term "panthenol compound" is broad enough to include panthenol, one or more pantothenic acid derivatives, and mixtures thereof. Panthenol and its derivatives can include D-panthenol ([R]-2,4-dihydroxy-N-[3-hydroxypropyl)]-3,3-dimethylbutamide), DL-panthenol, pantothenic acids and their salts, preferably the calcium salt, panthenyl triacetate, royal jelly, panthetine, pantotheine, panthenyl ethyl ether, pangamic acid, pantoyl lactose, Vitamin B complex, or mixtures thereof.

Compositions comprising pantothenic acid derivatives that remain more stable than panthenol and other similar materials in acidic compositions or in compositions containing acid-producing materials such as aluminum-containing actives, can also be suitable for use herein. The selected pantothenic acid derivatives are most typically in liquid form and dispersed throughout or otherwise solubilized within the liquid carrier component of the composition.

The term "pantothenic acid derivative" as used herein refers to those materials that conform to the formula:

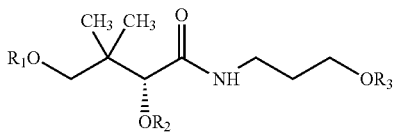

where R1, R2 and R3 are hydrogen, C2-C20 hydrocarbons, C2-C20 carboxylic acid esters, or combinations thereof, provided that not more than two of R1, R2 and R3 are hydrogen. In one embodiment, R1, R2 and R3 are independently selected from hydrogen, C2-C8 hydrocarbons, C2-C8 carboxylic acid esters, or combinations thereof, in another embodiment, R1 and R2 are hydrogen, and R3 is a C2-C8 hydrocarbon, C2-C8 carboxylic acid ester, or combinations thereof; in yet another embodiment, R1 and R2 are hydrogen and R3 is ethyl. The selected pantothenic acid derivatives may be derived or otherwise obtained from any known source, which may include pantothenic acid or materials other than pantothenic acid, so long as the resulting material has the above defined chemical formula. Specific non-limiting examples of pantothenic acid derivatives include ethyl panthenol, panthenyl triacetate, and combinations thereof. The pantothenic acid derivative may comprise the d-isomeric form(s) of such derivative form(s), such D-panthenol (also known as ethyl panthenol).

The composition can contain from about 0.01%, preferably from about 0.02%, more preferably from about 0.05%, and to about 3%, preferably to about 1%, more preferably to about 0.5% by weight of a panthenol compound, in view of usage feel and hair diameter increasing effect.

Chelators or Chelating Agents

The topical scalp care composition may comprise a safe and effective amount of a chelator or chelating agent, preferably from about 0.1% to about 10%, more preferably from about 1% to about 5%, by weight of the topical scalp care composition. As used herein, "chelator" or "chelating agent" means an active agent capable of removing a metal ion from a system by forming a complex so that the metal ion cannot readily participate in or catalyze chemical reactions. The inclusion of a chelating agent is especially useful for providing protection against UV radiation which can contribute to excessive scaling or skin texture changes and against other environmental agents which can cause skin damage.

pH Adjuster

The topical scalp care composition may comprise a safe and effective amount of one or more pH adjusters. pH adjusters may include acetic acid, aminomethyl propanol, citric acid, butyric acid, formic acid, lactic acid, maleic acid, uric acid, salicylic acid, or mixtures or salts thereof. pH adjusters may be used to modify and/or buffer the pH of the topical scalp care composition.

Propellants

When the topical scalp care system is in the product form of an aerosol, the composition may comprise a propellant. Aerosols are typically applied to the skin or scalp as a spray-on product. Aerosols and other spray-on products may be useful in providing broader ranges of coverage of the topical scalp care composition in a shorter amount of time than it would take for a user to apply a cream or lotion. Additionally, aerosols and other spray-on products generally allow for the user to apply the topical scalp care composition without having to utilize the fingers and/or any useful spreading tools (such as, for example, towels, wipes, tissues, and the like) to spread the topical scalp care composition onto the skin, minimizing risk of contaminating the affected situs with any additional bacteria from the fingers and/or spreading tools and minimizing clean-up for the user of the fingers and/or spreading tools.

Viscosity and pH of the Topical Scalp Care Composition

The topical scalp care composition may have a viscosity of from about 1,500 cPs to about 20,000 cPs when measured according to the Viscosity Test Method described herein. The viscosity of the composition as used herein is described as the Brookfield viscosity.

The topical scalp care composition may have a pH of from about 3 to about 6.9, or from about 4 to about 6.7, or from about 5 to about 6.5, or from about 5.8 to about 6.2. pH is measured according to the pH Test Method as described herein.

Methods of Making Topical Scalp Care Compositions

The topical scalp care compositions of the present disclosure may be generally prepared by conventional methods such as are known in the art of making topical compositions. Such methods typically involve mixing of the ingredients in one or more steps to a relatively uniform state, with or without heating, cooling, application of vacuum, and the like. The compositions may preferably be prepared such as to optimize stability (e.g., physical stability, chemical stability) and/or delivery of the active materials.

Methods of Using Topical Scalp Care Compositions

Topical scalp care compositions of the present disclosure may be used to treat symptoms of itch, flaking, scaling, plaques, and/or dryness of the scalp. The treatment method may include the steps of providing a topical scalp care composition according to the present disclosure and applying a safe and effective amount of the topical scalp care composition to at least a portion of a user's scalp in need thereof.

The itch, flaking, scaling, plaques, and/or dryness may be associated with at least one scalp condition selected from the group consisting of seborrheic dermatitis, atopic dermatitis, and psoriasis. Other conditions wherein itching, flaking, scaling, plaques, and/or dryness of the scalp may be experienced are also contemplated. The topical scalp care composition may be applied to the portion of the scalp in need thereof, including but not limited to the affected situs, the surrounding skin, when there are active flares present as well as when there are no active flares present. The topical scalp care composition may provide improvement of symptoms immediately after applying the topical scalp care composition, within one about (1) day after applying the topical scalp care composition, within about four (4) days after applying the topical scalp care composition, within about one (1) week after applying the topical scalp care composition, within about two (2) weeks after applying the topical scalp care composition, within about four (4) weeks after applying the topical scalp care composition, within about eight (8) weeks after applying the topical scalp care composition, and so on, generally less than about twelve (12) weeks after applying the topical scalp care composition. The topical scalp care composition may provide immediate improvement of symptoms, for example, within one (1) to sixty (60) minutes, within (1) to twenty-four (24) hours, within one (1) to seven (7) days after applying the topical scalp care application, and/or long-term improvement, for example, greater than twelve weeks after applying the composition.

Many regimens exist for the application of topical scalp care compositions. The step of applying a safe and effective amount of the topical scalp care composition to at least a portion of a user's scalp in need thereof may be performed, by way of nonlimiting example, as follows. A user may obtain the provided topical scalp care composition and apply a liberal amount of the topical scalp care composition to the portion of the scalp in need thereof, preferably with even more liberal application any affected situses and area surrounding the affected situses. The step of applying the topical scalp care composition to the portion of the user's scalp in need thereof may comprise applying from about 0.5 mg/cm$^2$ to about 250 mg/cm$^2$, or from about 2 mg/cm$^2$ to 100 mg/cm$^2$, or from about 5 mg/cm$^2$ to about 50 mg/cm$^2$ of the topical scalp care composition.

In a nonlimiting example, the step of applying the topical scalp care composition to the portion of the user's scalp in need thereof is repeated at least once, preferably at least twice, or on a more frequent basis, within a twenty-four-hour time period. When applied twice daily, the first and second applications may be separated by at least 1 to 12 hours. The topical scalp care composition may be applied in the morning and/or in the evening before bed. The topical scalp care composition may be applied when hair is dry or damp.

The step of applying the topical scalp care composition may be repeated during a treatment period. The treatment period is ideally of sufficient time to provide a relief or improvement of itch, flaking, scaling, plaques, and/or dryness of the scalp. The treatment period may be up until the user experiences relief or improvement in itch, flaking, scaling, plaques, and/or dryness of the scalp, but preferably the treatment period continues even after the user experiences relief or improvement in these symptoms, so that the topical scalp care composition may gradually improve the health of the scalp. Long-term application of the topical scalp care composition after the user experiences relief or improvement of symptoms may potentially lessen the frequency and/or severity of future occurrences of symptoms. The treatment period may be at least 2 consecutive days, at least 3 consecutive days, at least 4 consecutive days, at least 5 consecutive days, at least 6 consecutive days, at least 1 week, at least 2 weeks, at least 3 weeks, at least 4 weeks, at least 5 weeks, at least 6 weeks, at least 7 weeks, at least 8 weeks, and so on. The treatment period may extend over multiple months (i.e., 3-12 months) or multiple years. In a nonlimiting example, the topical scalp care composition may be applied at least once, preferably at least twice, a day during a treatment period of at least 1 week, about 2 weeks, about 3 weeks, about 4 weeks, about 8 weeks, or about 12 weeks. The topical scalp care composition may be concurrently applied in addition to any other prescription and/or non-prescription compositions the user may be taking.

In a nonlimiting example, after application of the topical scalp care composition to the portion of the user's scalp in need thereof, the topical scalp care composition is left on and not removed for at least five minutes. Preferably, the topical scalp care composition is not removed for at least thirty minutes, more preferably for at least one hour, even more preferably for at least several hours. A user may cleanse the scalp, prior to application of the topical scalp care composition, e.g., shampooing the head. A user may apply the topical scalp care composition without cleansing the scalp prior to application.

Combinations

A. A composition comprising from about 0.1% to about 10% laureth-9, preferably from about 0.2% to about 8 wt. % laureth-9, greater than about 60% water, preferably greater than about 70% water, more preferably greater than 80%, more preferably greater than 90% water, even more preferably greater than 92% water, less than about 5% of ethanol, methanol, iso-propanol, n-propanol, or a mixture thereof, preferably less than about 1% of ethanol, methanol, iso-propanol, n-propanol, or a mixture thereof, and less than about 5% of an ionic surfactant selected from the group consisting of sodium laureth sulfate, sodium lauryl sulfate, TEA lauryl sulfate, sodium lauroyl sarcosinate, sodium stearate, sodium olefin sulfonate, disodium laureth sulfosuccinate, disodium oleamine sulfosuccinate, sodium dioctyl sulfosuccinate, isethionates, taurates, cetrimonium bromide, cetylpyridinium chloride, sodium lauriminodipropionate, disodium lauroamphodiacetate, cocamido propyl betaine, and mixtures thereof, wherein said composition has a viscosity of about 1,500 cPs to about 20,000 cPs and wherein said composition is a leave-on treatment for the scalp.

B. The composition of paragraph A, wherein the composition further comprises at least one active selected from the group consisting of a xanthine compound, preferably from about 0.1% to about 10% of a xanthine compound, a vitamin B3 compound, preferably from about 0.1% to about 25% of a vitamin B3 compound, a panthenol compound, preferably from about 0.01% to about 3% of a panthenol compound, salicylic acid, preferably from about 0.1% to about 10% of salicylic acid, *Centella asiatica*, preferably from about 0.000001% to about 5% of *Centella asiatica, Avena* (oat) extract, preferably from about 0.00001% to about 25% of an *Avena* (oat) extract, and combinations thereof.

C. A system for treating the scalp, including scalp psoriasis, scalp itching, scalp flaking, scalp scaling, scalp plaques, and scalp dryness, comprising:
  a. a composition comprising laureth-9, greater than about 60% water, and less than about 5% of ethanol, methanol, iso-propanol, n-propanol, or a mixture thereof, wherein said composition has a viscosity of about 1,500 cPs to about 20,000 cPs and wherein said composition is preferably a leave-on scalp composition;
  b. an applicator comprising a reservoir, for containing from about 25 g to about 600 g of the composition, and one or more nozzles, wherein each nozzle has at least one opening having an area of from about 0.2 mm$^2$ to about 12 mm$^2$.

D. A system for treating the scalp, including scalp psoriasis, scalp itching, scalp flaking, scalp scaling, scalp plaques, and scalp dryness, comprising:
  c. a composition comprising laureth-9, greater than about 60% water, and less than about 5% of ionic surfactant, wherein said composition has a viscosity of about 1,500 cPs to about 20,000 cPs and wherein said composition is preferably a leave-on scalp composition;
  d. an applicator comprising a reservoir, for containing from about 25 g to about 600 g of the composition, and one or more nozzles, wherein each nozzle has at least one opening having an area from about 0.2 mm$^2$ to about 12 mm$^2$.

E. The system according to any one of the preceding claims, wherein the applicator has twenty or fewer nozzles, preferably fifteen or fewer nozzles, more preferably ten or fewer nozzles, even more preferably 5 or fewer nozzles.
F. The system according to any one of the preceding claims, wherein each opening is substantially circular and has a diameter of about 0.5 mm to about 4 mm, preferably about 0.75 mm to about 3 mm.
G. The system according to any one of the preceding claims, where the total area of all the openings is from about 0.2 mm$^2$ to about 20 mm$^2$.
H. The system according to any one of the preceding claims, wherein the composition is shear-thinning.
I. The system according to any one of the preceding claims, wherein the composition has a critical time to break up of about 0.01 to about 0.6 seconds as measured by the CaBER method.
J. The system according to any one of the preceding claims, wherein the composition has a pH ranging from about 3.0 to about 6.9, preferably from about 4 to about 6.5.
K. The system according to any one of the preceding claims, wherein the composition is substantially free of an oil.
L. The system according to any one of the preceding claims, wherein the composition is transparent or translucent.
M. The system according to any one of the preceding claims, wherein the applicator is transparent.
N. The system according to any one of the preceding claims, wherein the composition further comprises an organic acid and/or a salt thereof.
O. The system according to any one of the preceding claims, wherein the composition is substantially odorless.
P. The system according to any one of the preceding claims, wherein the length (L) of each nozzle is about 8 mm to about 100 mm, or about 10 mm to about 80 mm, or about 15 mm to about 60 mm, or about 20 mm to about 50 mm, or about 25 mm to about 40 mm.
Q. The system according to any one of the preceding claims, wherein the width (W) of each nozzle is about 1 mm to about 20 mm, or about 2 mm to about 15 mm, or about 4 mm to about 13 mm.
R. The system according to any one of the preceding claims, wherein the one or more nozzles are tapered.
S. The system according to any one of the preceding claims, wherein the one or more nozzles are cylindrical.
T. The system according to any one of the preceding claims, wherein the system is an aerosol and the composition comprises a propellant.
U. The system according to any one of the preceding claims, wherein the composition is a solution.
V. The system according to any one of the preceding claims, wherein the composition comprises from about 0.1% to about 10% laureth-9, preferably from about 0.2% to about 8 wt. % laureth-9, greater than about 70% water, more preferably greater than 80%, more preferably greater than 90% water, even more preferably greater than 92% water, less than about 5% of ethanol, methanol, iso-propanol, n-propanol, or a mixture thereof, preferably less than about 1% of ethanol, methanol, iso-propanol, n-propanol, or a mixture thereof, and less than about 5% of an ionic surfactant selected from the group consisting of sodium laureth sulfate, sodium lauryl sulfate, TEA lauryl sulfate, sodium lauroyl sarcosinate, sodium stearate, sodium olefin sulfonate, disodium laureth sulfosuccinate, disodium oleamine sulfosuccinate, sodium dioctyl sulfosuccinate, isethionates, taurates, cetrimonium bromide, cetylpyridinium chloride, sodium lauriminodipropionate, disodium lauroamphodiacetate, cocamido propyl betaine, and mixtures thereof.
W. The system according to any one of the preceding claims, wherein the composition further comprises at least one active selected from the group consisting of a xanthine compound, preferably from about 0.1% to about 10% of a xanthine compound, a vitamin B3 compound, preferably from about 0.1% to about 25% of a vitamin B3 compound, a panthenol compound, preferably from about 0.01% to about 3% of a panthenol compound, salicylic acid, preferably from about 0.1% to about 10% of salicylic acid, *Centella asiatica*, preferably from about 0.000001% to about 5% of *Centella asiatica, Avena* (oat) extract, preferably from about 0.00001% to about 25% of an *Avena* (oat) extract, and combinations thereof.
X. The system according to any one of the preceding claims, wherein the composition further comprises a thickener selected from the group consisting of carboxylic acid polymers, crosslinked poly(meth)acrylate polymers, polyacrylamide polymers, polysaccharides, gums, crosslinked vinyl ether/maleic anhydride copolymers, crosslinked poly(N-vinylpyrrolidones), and mixtures thereof.

Test Methods pH Test Method pH can be measured using a standard pH meter such as, for example, a Beckman Coulter model PHI1410 pH meter equipped with a general-purpose probe (manufactured by Beckman Coulter, Brea, California, U.S.A.). The pH meter is calibrated according to the manufacturer's instructions. Measurements are performed after storing the compositions at room temperature (approximately 23° C.±2° C.) for approximately 24 hours.

Viscosity Test Method

The viscosity of samples can be measured using a standard viscometer, such as, for example, a Brookfield DV2T viscometer (manufactured by Brookfield Ametek, Middleboro, Massachusetts, U.S.A.), fitted with a helipath T-bar spindle type T-C. The viscometer is leveled, setup and calibrated according to the manufacturer's standards. The viscometer speed (RPM) is selected to ensure the measured viscosity is within the manufacturer's recommended settings (e.g., 5 RPM).

Samples are stored in sealed glass jars with an opening and internal diameter of at least 40 mm and filled to a height of at least 50 mm with care taken to avoid entrapped air bubbles. Centrifugation may be used to help removed entrained air. Sample jars are equilibrated at 23° C.±2° C. and about 50%±2% relative humidity for at least 24 hours prior to measurement.

Viscosity is measured at 23° C.±2° C. and about 50%±2% relative humidity by placing the uncapped sample jar under the viscometer and lowering the viscometer until the tip of the T-bar touches the surface of the sample. The descending helipath is turned on and travels downward 2.5-3 cm/minute and a timer started once the cross-bar of the T-bar touches the surface of the sample. A reading is taken about every 9 seconds over the time period of between about 45 seconds and about 1 minute. The viscosity is calculated as the arithmetic average of the viscosities recorded. Care is taken to ensure the T-bar does not touch the glass jar.

Time to Break as Measured Using the CaBER Method

Stringiness is measured as the time to break using the Capillary Breakup Extensional Rheometer (Thermo Fisher Scientific HAAKE CaBER™ 1). The instrument settings are adjusted as in the below table using the required software supplied by the manufacturer. After the sample is loaded and the measurement initiated, the data is collected automatically as described in the detailed HAAKE CaBER 1 Operating Manual supplied with the instrument or available on the online manufacturer's website. The data is the critical time to breakup (expressed in seconds). Measurements are made at 23° C.±2° C. and about 50%±2% relative humidity and the time to break is determined to be the time in seconds it takes for the liquid filament to break.

Setting Specifications Used on the Thermo Fisher Scientific HAAKE CaBER™ 1:

Hencky strain: 1.84
Shear Viscosity range: 10-106 mPas
Plate/Sample diameter: Standard=6 mm
Temperature range: Ambient
Diameter resolution: 0.1 nmm
System response time: 10 ms
Drive system used: Linear drive
Sample start height: 0.996 mm
Sample end height: 6.29 mm
Sample data collection time: 0 s to 6 s
Replicates averaged for one sample result 5

EXAMPLES

The following data and examples, including comparative examples, are provided to help illustrate the topical scalp care compositions described herein. The exemplified compositions are given solely for the purpose of illustration and are not to be construed as limitations of the present disclosure, as many variations thereof are possible without departing from the spirit and scope of the disclosure. All parts, percentages, and ratios herein are by weight unless otherwise specified.

Example 1

Composition Preparation

Compositions according to Table 1 are prepared for dispensing and consumer testing. Water is weighed into a beaker and continuously mixed using an overhead mixer (e.g., IKA RW20 Digital Overhead Mixer). All ingredients, except the aminomethyl propanol, are added individually to the beaker. Next, the pH of the solution is measured using the pH Test Method and aminomethyl propanol added to achieve the target pH value of 5.7 to 6.2.

TABLE 1

| Compositions | | |
| --- | --- | --- |
| Ingredient Type | Composition A | Composition B |
| Purified water | balance | 93.257 g |
| Citric acid | 0.015 g | 0.015 g |
| Sodium citrate | 0.100 g | 0.100 g |
| Glycerin | 2.000 g | 2.000 g |
| Hexanediol and caprylyl glycol[1] | 0.500 g | 0.500 g |
| Phenoxyethanol | 0.650 g | 0.650 g |
| Acrylate/C10-30 alkyl acrylate crosspolymer[2] | — | 0.300 g |
| Acrylate/C10-30 alkyl acrylate crosspolymer[3] | 0.150-0.830[4] g | — |
| Laureth-9 | 2.000 g | 2.000 g |
| Glycereth-25 PCA isostearate | 0.600 g | 0.600 g |
| Botanical extract | 0.018 g | 0.018 g |
| Ethanol | 0.400 g | 0.400 g |
| Aminomethyl propanol | 0.150-0.520[5] g | 0.160 g |
| Viscosity [cPs] | See Table 2 | 3,960 cPs |
| pH | 5.8-6.2 | 5.73 |

[1]SYMDIOL ® 68 commercially available from Symrise (Holzminden, Germany)
[2]Carbopol Ultrez 21 commercially available from Lubrizol (Wickliffe, Ohio)
[3]Carbopol Ultrez 20 or 21 commercially available from Lubrizol (Wickliffe, Ohio)
[4]Levels and type described in detail in Table 2
[5]As the viscosity increasing agent is increased aminomethyl propanol level is increased to achieve pH target Example 2

Evaluation of Usability as a Function of Package Nozzle Opening Area and Composition Viscosity Eleven compositions based on Composition A in Table 1 are made according to Example 1, with the thickener type and levels described in Table 2 and the viscosity of each composition is measured using the Viscosity Test Method and reported in Table 2. Standard bottles purchased from Amazon (bottles typically used for hair dye application, Soft 'N Style 4 oz applicator bottle and Soft 'N Style 8.5 oz applicator bottle with angle tip) and Uline (4 oz Boston Round Squeeze bottle with cap) are filled with approximately 30 g of composition. The bottles are capped with different nozzles, where each nozzle has a single circular opening, having openings of varying sizes.

The compositions are then dispensed from the bottles. The bottle is held with one hand in an inverted position and the bottle is squeezed with one hand until product flows from the bottle and the dispensing is observed. "Acceptable dispensing" means that the composition does not leak out of the bottle when the bottle is inverted without applying force to the bottle (e.g., by suspending the bottle between two fingers held in a V shape) and, when the bottle is squeezed, the composition flows freely from the bottom of the bottle to the tip, rather than adhering to the sides of the bottle.

After the composition is dispensed, it is also observed on the skin, using the back of a hand held in a vertical position as a proxy for the scalp (this makes it is easier to observe the product's behavior). "Acceptable on scalp" means the composition stays in place rather than running down the skin on the back of the hand, but will not mound on the skin (indicating it won't get on the hair). The results are shown below in Table 2.

TABLE 2

| Dispensing test summary | | | | | |
| --- | --- | --- | --- | --- | --- |
| Thickener Type | Thickener, [g] | Nozzle Opening Area[1] [mm$^2$] | Brookfield Viscosity [cps] | Acceptable Dispensing | Acceptable on scalp |
| U21[2] | 0.15 | 0.5 | 200 | No | No |
| U21 | 0.25 | 0.5 | 2,300 | Yes | Yes |
| U21 | 0.27 | 0.5 | 3,400 | Yes | Yes |

TABLE 2-continued

Dispensing test summary

| Thickener Type | Thickener, [g] | Nozzle Opening Area[1] [mm²] | Brookfield Viscosity [cps] | Acceptable Dispensing | Acceptable on scalp |
|---|---|---|---|---|---|
| U21 | 0.30 | 0.5 | 4,700 | Yes | Yes |
| U20[3] | 0.30 | 0.5 | 6,300 | Yes | Yes |
| U21 | 0.33 | 0.5 | 9,700 | Yes | Yes |
| U21 | 0.40 | 0.5 | 13,000 | Yes | Yes |
| U21 | 0.44 | 0.5 | 17,000 | Yes | Yes |
| U21 | 0.48 | 0.5 | 21,000 | No | No |
| U21 | 0.50 | 0.5 | 26,000 | No | No |
| U21 | 0.83 | 0.5 | 49,000 | No | No |
| U21 | 0.25 | 2.8 | 2,300 | Yes[4] | Yes |
| U21 | 0.27 | 2.8 | 3,400 | Yes | Yes |
| U21 | 0.30 | 2.8 | 4,700 | Yes | Yes |
| U21 | 0.33 | 2.8 | 9,700 | Yes | Yes |
| U21 | 0.40 | 2.8 | 13,000 | Yes | Yes |
| U21 | 0.44 | 2.8 | 17,000 | Yes | Yes |
| U21 | 0.48 | 2.8 | 21,000 | No | No |
| U21 | 0.50 | 2.8 | 26,000 | No | No |
| U21 | 0.25 | 6.6 | 2,300 | Yes[4] | Yes |
| U21 | 0.27 | 6.6 | 3,400 | Yes[4] | Yes |
| U21 | 0.30 | 6.6 | 4,700 | Yes | Yes |
| U21 | 0.25 | 10.2 | 2,300 | Yes[4] | Yes |
| U21 | 0.27 | 10.2 | 3,400 | Yes[4] | Yes |
| U21 | 0.30 | 10.2 | 4,700 | Yes[4] | Yes |
| U20 | 0.30 | 10.2 | 6,300 | Yes | Yes |

[1]Single nozzle with a single, circular opening
[2]Acrylates/C10-30 Alkyl Acrylate Crosspolymer - Carbopol Ultrez 21 supplied by Lubrizol (Wickliffe, Ohio)
[3]Acrylates/C10-30 Alkyl Acrylate Crosspolymer - Carbopol Ultrez 20 supplied by Lubrizol (Wickliffe, Ohio)
[4]Marginal, not ideal The lower bound for acceptable composition viscosity for a nozzle opening having an area from about 0.8 mm² to about 50 mm² may be defined by the following equation:

$$\text{Viscosity (cps)} \geq 402 \, (\text{cps/mm}^2) \times \text{nozzle opening area} \, (\text{mm}^2) + 2166 \, (\text{cps}).$$

When the opening is circular or substantially circular, the lower bound for acceptable composition viscosity for a nozzle having a single opening and a diameter from about 0.5 mm to about 4 mm may be defined by the following equation, $$\text{Viscosity (cps)} > 1383 \, (\text{cps/mm}) \times \text{nozzle diameter (mm)} + 1010 \, (\text{cps}).$$

Example 3

Consumer Study

A blind and instructed, daily, single product use test is conducted over a 14-day period using Composition B from Example 1, Table 1. Participants are males and females over eighteen (18) years of age, who meet all three of the following criteria at the beginning of the test period: 1) experiencing a psoriasis flare on their scalp (self-report), 2) psoriasis flares typically last 3 or more weeks (self-report); and 3) scalp flaking/scaling rating of 5 or higher on a 0-10 scale (0=none, 10=severe) (self-report).

Each participant is provided with a bottle containing 135 g of Composition B of Table 1. The bottle is fitted with a single, 33 mm long nozzle having a single circular opening that is 0.8 mm in diameter. Participants are instructed to apply the test product to affected areas of the scalp twice a day each day of the test period, once in the morning and once in the evening. Participants are told to leave the composition on and not to rinse their scalp/hair after application. Participants are advised to apply the composition when hair is dry or damp. Participants are further instructed not to use any over-the-counter lotions, creams, or ointments during the study. Participants are instructed to continue using any product prescribed by a physician during the study.

Participants complete a questionnaire immediately after completing the 14-day test product usage period. The questions and statistical summaries of the results of the post-test questionnaire for are set forth in Table 5.

Consumer Acceptance Ratings

Thirteen participants use the test product according to the above instructions over the test period. Participants are asked in the post-test questionnaire a series of prompts (reproduced in Table 3, below) and to select a score (100=excellent; 75=very good; 50=good; 25=fair; 0=poor) as to their opinion in response to the prompt "Please rate the psoriasis scalp treatment product on the following characteristics." Responses for each prompt are averaged to provide a resulting score prompt per each respective group of participants. Results are shown in Table 3, below. Average rating=(100×number of panelists who selected Excellent+75×number of panelists who selected Very Good+50×number of panelists who selected Good+25×number of panelists who selected Fair+0×number of panelists who selected Poor).

TABLE 3

Consumer test summary

| | Average Rating |
|---|---|
| Reducing scalp itching | 92 |
| Reducing scalp flaking/scaling | 87 |
| Leaving scalp feeling soothed | 92 |
| Leaving scalp soft and smooth | 88 |
| Leaving scalp feeling moisturized | 83 |
| Not weighing hair down | 81 |
| Targeted, goes directly on scalp without getting on hair | 75 |
| Fast and easy to use | 88 |
| Easy to control where the product goes & how much is applied | 75 |

Composition B of Table 1 improved the symptoms of itching, flaking, and scaling and left the scalp feeling soothed, moisturized, soft, and smooth, without negatively impacting the hair.

Example 4

Further Non-Limiting Examples of Topical Scalp Care Compositions

TABLE 4

Topical Scalp Care Compositions

| Ingredient | 1 | 2 | 3 | 4 | 5 | 6 | 7 |
|---|---|---|---|---|---|---|---|
| pH adjuster[1] | 0.015 | 0.02 | 0.015 | 0.025 | 0.015 | 0.000 | 0.015 |
| pH adjuster[2] | 0.100 | 0.100 | 0.100 | 0.100 | 0.100 | 0.000 | 0.100 |
| Humectant[3] | 2.000 | 1.000 | 4.000 | 0.500 | 0 | 1.500 | 2.000 |
| Preservative[4] | 0.500 | 0.500 | 0.500 | 0.500 | 0.500 | 0.500 | 0.500 |
| Preservative[5] | 0.650 | 0.650 | 0.650 | 0.650 | 0.650 | 0.650 | 0.650 |
| Thickener[6] | 0.300 | 0.300 | 0.300 | 0.000 | 0.300 | 0.000 | 0.300 |
| Thickener[7] | 0.000 | 0.000 | 0.000 | 0.500 | 0.000 | 0.000 | 0.000 |
| Laureth-9 | 2.000 | 1.000 | 4.000 | 1.500 | 2.000 | 2.000 | 3.000 |
| Emulsifier[8] | 0.600 | 0.500 | 0.600 | 0.750 | 0.600 | 0.600 | 0.600 |
| pH Adjuster[9] | 0.160 | 0.160 | 0.160 | 0.160 | 0.160 | 0.160 | 0.160 |
| Vitamin B3 compound[10] | 0.000 | 1.000 | 0.000 | 0.000 | 1.250 | 0.000 | 0.000 |
| D-Panthenol[11] | 0.000 | 1.000 | 0.000 | 0.000 | 1.500 | 0.000 | 0.000 |
| Xanthine[12] | 0.000 | 1.500 | 0.000 | 0.000 | 1.000 | 0.000 | 0.000 |
| pH adjuster[13] | 0.000 | 0.000 | 0.000 | 1.800 | 2.000 | 0.000 | 1.800 |
| Botanical Extract[14] | 0.000 | 0.000 | 0.006 | 0.000 | 0.000 | 0.000 | 0.006 |
| Botanical Extract[15] | 0.000 | 0.000 | 3.000 | 0.000 | 0.000 | 0.000 | 3.000 |
| Sugar Alcohol 16 | 0.000 | 0.000 | 3.000 | 0.000 | 0.000 | 0.000 | 1.000 |
| Ethanol | 0.400 | 0.400 | 2.000 | 4.900 | 1.000 | 4.900 | 0.400 |
| Carrier[17]* | Balance | Balance | Balance | Balance | Balance | Balance | Balance |
|  | 100.000 | 100.000 | 100.000 | 100.000 | 100.000 | 100.000 | 100.000 |

*The carrier amount is adjusted as additional materials are added to maintain the total formula at 100%.
[1] Citric Acid
[2] Sodium Citrate
[3] Glycerin
[4] Hexanediol and Caprylyl Glycol
[5] Phenoxyethanol NF
[6] Acrylates/C10-30 Alkyl Acrylate Crosspolymer - Carbopol Ultrez 21 supplied by Lubrizol (Wickliffe, Ohio)
[7] Sepigel 305
[8] Glycereth-25 PCA isostearate
[9] Aminomethyl propanol, 95%
[10] Niacinamide
[11] D-Panthenol
[12] Caffeine
[13] Salicylic acid
[14] Centella asiatica
[15] Avena (oat) extract
[16] Trehalose
[17] United States Pharmacopeia (USP) Purified Water The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for treating scalp itch, flaking, scaling, plaques, and/or dryness comprising:
   a. a composition comprising laureth-9, from 92% to 95% by weight of the composition of water, and less than about 5% of an ionic surfactant, ethanol, methanol, iso-propanol, n-propanol, or a mixture thereof, wherein said composition has a pH of about 3.0 to about 6.9 and a viscosity of about 1,500 cPs to about 20,000 cPs, and wherein said composition is a leave-on scalp composition and is free of an oil; and b. an applicator comprising a reservoir configured to contain about 25 g to about 600 g of the composition, and one or more nozzles, wherein each nozzle has at least one opening having an area of about 0.2 mm² to about 12 mm².

2. The system according to claim 1, wherein the applicator has twenty or fewer nozzles.

3. The system according to claim 1, wherein each opening is substantially circular and has a diameter of about 0.5 mm to about 4 mm.

4. The system according to claim 1, where the total area of all the openings is about 0.2 mm² to about 20 mm².

5. The system according to claim 1, wherein the composition is shear-thinning.

6. The system according to claim 1, wherein the composition is transparent or translucent.

7. The system according to claim 1, wherein the applicator is transparent or translucent.

8. The system according to claim 1, wherein the composition further comprises an organic acid and/or a salt thereof.

9. The system according to claim 1, wherein the composition is substantially odorless.

10. The system according to claim 1, wherein the length of each nozzle is about 8 mm to about 100 mm.

11. The system according to claim 1, wherein the external width of each nozzle is about 1 mm to about 20 mm.

12. The system according to claim 1, wherein the applicator has one nozzle, wherein the nozzle has one opening having an area of about 0.2 mm² to about 10 mm².

13. The system according to claim 1, wherein the composition comprises about 0.1% to about 10% laureth-9, less than about 5% of ethanol, methanol, iso-propanol, n-propanol, or a mixture thereof, and less than about 5% of an ionic surfactant selected from the group consisting of sodium laureth sulfate, sodium lauryl sulfate, TEA lauryl sulfate, sodium lauroyl sarcosinate, sodium stearate, sodium olefin sulfonate, disodium laureth sulfosuccinate, disodium oleamine sulfosuccinate, sodium dioctyl sulfosuccinate, isethionates, taurates, cetrimonium bromide, cetylpyridinium chloride, sodium lauriminodipropionate, disodium lauroamphodiacetate, cocamido propyl betaine, and mixtures thereof.

14. The system according to claim 1, wherein the composition further comprises about 0.1% to about 10% of a xanthine compound, about 0.1% to about 25% of a vitamin B3 compound, about 0.01% to about 3% of a panthenol compound, about 0.1% to about 10% of salicylic acid, about 0.000001% to about 5% of *Centella asiatica*, about 0.00001% to about 25% of an *Avena* (oat) extract, or a combination thereof.

15. The system according to claim 1, wherein the composition further comprises a thickener selected from the group consisting of carboxylic acid polymers, crosslinked poly(meth)acrylate polymers, polyacrylamide polymers, polysaccharides, gums, crosslinked vinyl ether/maleic anhydride copolymers, crosslinked poly(N-vinylpyrrolidones), and mixtures thereof.

16. The system according to claim 1, wherein the one or more nozzles is a single nozzle with a diameter from about 0.5 mm to about 4 mm and a lower bound for the viscosity is defined by: viscosity (cps)>1383 (cps/mm)×nozzle diameter (mm)+1010 (cps).

17. A method of treating a scalp condition selected from itch, flaking, scaling, plaques, and dryness of the scalp comprising the steps of providing the system of claim 1 and applying the composition onto the scalp.

18. A system for treating scalp itch, flaking, scaling, plaques, and/or dryness comprising:

a. a composition comprising laureth-9, from 92% to 95% by weight of the composition of water, about 0.1% to about 10% of a xanthine compound, about 0.1% to about 25% of a vitamin B3 compound, about 0.01% to about 3% of a panthenol compound, about 0.1% to about 10% of salicylic acid, about 0.000001% to about 5% of *Centella asiatica*, about 0.00001% to about 25% of an *Avena* (oat) extract, or a combination thereof, and less than about 5% of an ionic surfactant, ethanol, methanol, iso-propanol, n-propanol, or a mixture thereof, wherein said composition has a pH of about 3.0 to about 6.9 and a viscosity of about 1,500 cPs to about 20,000 cPs, and wherein said composition is a leave-on scalp composition; and b. an applicator comprising a reservoir configured to contain about 25 g to about 600 g of the composition, and one or more nozzles, wherein each nozzle has at least one opening having an area of about 0.2 mm² to about 12 mm².

19. The system of claim 18, wherein the composition is substantially free of an oil.

* * * * *